United States Patent Office 3,102,868
Patented Sept. 3, 1963

3,102,868
WATER SOLUBLE COMPOSITION FOR BAKED SURFACE COATINGS COMPRISING A POLYESTER RESIN AND AN AMINO RESIN
Benjamin A. Bolton, Gary, Ind., and Ronald L. Broadhead, Park Forest, Ill., assignors to Standard Oil Company, Chicago, Ill., a corporation of Indiana
No Drawing. Filed June 17, 1960, Ser. No. 36,721
11 Claims. (Cl. 260—45.3)

This invention relates to water soluble resins characterized by thermosetting properties.

Extremely water soluble polyester resins are now available for the production of baked surface coating finishes. These polyester resins are based upon benzene tricarboxylic acid, aliphatic dicarboxylic acid, and aliphatic polyol. In order to obtain the highest quality surface coatings, films from these polyester resins must be baked at temperatures on the order of 400° F. Commercial baking equipment and also the presence of materials injurable by heat limit baking temperatures to in the region of 300° F.; even lower baking temperatures are preferred.

A resin composition has become available which is suitable for producing commercially acceptable baked surface coatings at temperatures on the order of 250° F.–300° F. which composition consists essentially of a mixture of a water soluble polyester resin derived from benzene tricarboxylic acid, aliphatic polyol, and aliphatic dicarboxylic acid and a water soluble amino-resin. However, this resin composition produces baked films somewhat low in resistance to attack by alkaline detergent solutions.

It has been discovered that a resin composition of excellent resistance to attack by aqueous alkaline detergent solutions is afforded by the mixture of a water soluble modified polyester resin derived from benzene tricarboxylic acid, aliphatic polyol, aliphatic dicarboxylic acid, and polyalkylene glycol monoalkyl ether in admixture with a water soluble amino resin. The mixture of resins contains 5–40 weight percent of amino resin and 95–60 weight percent of modified polyester resin; more commonly 15–25 weight percent of amino resin and 85–75 weight percent of modified polyester resin.

Water Soluble Modified Polyester Resin

The modified polyester resin condensation reaction product is prepared by condensing a benzene tricarboxylic acid, an aliphatic polyol, aliphatic dicarboxylic acid containing at least 4 carbon atoms, and a polyalkylene glycol monoalkyl ether at elevated temperatures, for example, about 300°–400° F., while continuously removing the water formed in the reaction. The polyester condensation reaction is well known and it is not necessary to describe it in detail herein.

The benzene tricarboxylic acids and anhydrides may also be described as acidic members selected from the class consisting of benzene tricarboxylic acids containing, as the only substituents, 3 carboxyl groups, and anhydrides thereof. The individual members of the defined class are trimellitic acid, trimellitic anhydride, trimesic acid, hemimellitic acid and hemimellitic anhydride. Trimellitic anhydride is the preferred acidic member.

The reaction requires the presence of an aliphatic polyol containing two or more hydroxy groups. Any of the well-known aliphatic polyols may be used such as alkylene gylcols (including the ether glycols) glycerol, tetrahydroxy alcohols, and hexahydroxy alcohols. Examples of suitable aliphatic polyols are ethylene glycol, propylene glycol, hexamethylene glycol, diethylene glycol, triethylene glycol, glycerol, trimethylol-propane, erythritol, pentaerythritol, dipentaerythritol, mannitol, and sorbitol. The lower glycols containing 2–12 carbon atoms are preferred polyols.

The reaction requires the presence of an aliphatic dicarboxylic acid containing from at least 4 carbon atoms to about 60 carbon atoms. Examples of suitable acids are succinic, glutaric, adipic, suberic, sebacic, maleic, itaconic, 1,6-hexene-3-dioic, linoleic-dimer, hexadecanedioic, eicosanedioic, hexacosanedioic and tetratriacontanedioic. The alkanedioic acids containing from 4 to about 20 carbon atoms are preferred.

The other reactant for the polyester resin is a polyalkylene glycol monoalkyl ether. This ether preferably contains from 2 to 8 ether groups; each alkylene unit present in the ether contains from 2 to 3 carbon atoms, i.e., the alkylene units are either ethylene or propylene; the alkyl group present in the ether contains from 1 to 8 carbon atoms. Numerous species of the defined ethers are available commercially under the "Carbitol" trade name. Specifically, the defined ethers are known as alkyl Carbitols. The Carbitols are alkylation reation products of ether glycols and alkanols. Illustrative ether glycols are diethylene glycol, triethylene glycol, tetraethylene glycol, and polyethylene glycols containing not more than 8 ether linkages; dipropylene glycol, tripropylene glycol, and polypropylene glycols containing not more than 8 ether linkages. Illustrative alkanols are methanol, ethanol, isopropyl alcohol, n-butanol, t-butyl alcohol, and octanol. The mixtures of isomeric alkanols prepared by the Oxo process are particularly suitable, especially isooctyl alcohol. Illustrative of the nomenclature utilized herein is the alkylation product of diethylene glycol with ethanol which product is known as diethylene glycol monoethyl ether or 2-(2-ethoxyethoxy)ethanol or ethyl Carbitol.

The characteristics of the polyester resin condensation reaction product is dependent upon the type of reactants, and upon the mole ratios existing among the reactants. In general, the mole ratio of the defined benzene acid to defined polyol to the defined dicarboxylic acid to the defined ether is from about 2:7:2:1 to 4:7:1.5:4. Ratios of reactants outside the spelled out range may be utilized for production of resins having special properties. When a glycol (alkanediol or alkane(ether)diol) is used as the polyol, the preferred ratio of reactants in the polyester condensation zone is from about 3:7:1:1.0 to about 4:7:1.5:4. (At the same ratio of reactants, the surface coatings obtainable from the resins may not be of essentially identical characteristics for different reaction systems.)

The polyester resin condensation reaction product desirably is prepared under conditions of reaction such that the resin has an acid number between about 20 and 40; more desirably about 20–30. (It is to be understood that not all combinations of the defined reactants can produce an acid number as low as 20, however.)

The polyester resin condensation reaction products range from very viscous liquids to hard solids in appearance. These polyester products possess the common characteristic of forming "rigid" solids when baked at temperatures on the order of 400° F. in the presence of oxygen or air. The degree of baking (curing) needed to obtain a thermoset material will depend upon the particular polyester product. In general, the products made from trimellitic anhydride, alkanedioic acids, and lower glycols form thermoset materials at 400° F. in times ranging from 15 minutes to 1 hour. These polyester resins will cure to thermoset materials at lower temperatures, but require much longer times.

The polyester condensation reaction may be carried out in normal fashion, with all of the reactants charged simultaneously. It is preferred to prepare the modified polyester resin in a two-step procedure. In the first step, the benzene tricarboxylic acid, the aliphatic polyol, and the aliphatic dicarboxylic acid are condensed to a polyester resin having an acid number from about 50 to about 150. Then the desired amount of the defined ether is added and the condensation reaction continued until the acid number has been reduced to the level corresponding to the amount of ether added or to about 20.

The water soluble modified polyester resin consists essentially of the resin produced by the reaction of the polyester condensation reaction product and an alkaline reacting material. The resin product and the alkaline material are reacted until a water soluble resin is obtained. The amount of alkaline reacting material is most readily determined by following the pH of the reaction medium. An aqueous reaction medium is preferred when the water soluble resin is to be used for surface coating applications because the desired water solution is obtained immediately. When the resin and aqueous reaction medium are contacted in the presence of an alkaline reacting material, the resin passes into solution substantially completely at a pH of about 5. In practically all instances, the resin will be in complete solution at a pH of about 6. The use of alkaline reacting material in excess of that needed to bring all the resin into solution is not harmful; at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Aqueous ammonium hydroxide is particularly suitable. The hydrocarbon amines, particularly the lower molecular weight hydrocarbon amines containing not more than 4 carbon atoms in each aliphatic group, are suitable. The alkanolamines, such as ethanolamines, diethylethanolamine and aminopropanol are preferred. The heteroamines, such as morpholine, pyridine, and piperidine may be used. The type of alkaline reacting material used is determined in part by the characteristics desired in the final water soluble resin; also, by the type of resin which is to be converted to a water soluble form.

The neutralization reaction is carried out by contacting the resin and the alkaline reacting medium in the presence of a liquid reaction medium; particularly suitable reaction mediums are oxygenated organic solvents and water. When water is used as the liquid reaction medium, it is preferred that it be warm, i.e., maintained in the region of 100–160° F.; the resin product is added to the aqueous alkaline reaction material and the two agitated until the resinous product has passed into solution. The water solutions of the water soluble modified polyester resin are clear liquids usually containing some opalescent appearance; the solutions may be colorless or colored, depending on the particular water soluble resin present.

The water soluble modified polyester resin, when exposed to oxygen or air at elevated temperatures, air-bake or cure to thermoset solids. At temperatures on the order of 400° F., the water soluble resin produces hard films on metal surfaces in times of 15 minutes to 1 hour.

In addition to their high solubility in water, which may be as much or more than 50 percent by weight, the water soluble resins are also soluble in the ordinary oxygenated organic solvents as well as in mixtures of these with benzene hydrocarbons. Because of its cheapness and safety, water is the preferred solution for surface coating applications.

Water Soluble Amino Resin

The composition of the invention includes a water soluble amino resin of the type of melamine-formaldehyde resins and guanamine-formaldehyde resins. The melamine resins include the methylol melamines containing as many as six groups from formaldehyde; also the water soluble alkylated melamine-formaldehyde resins, such as, methylated(methylol melamine) and ethylated(methylol melamine). The water soluble guanamine-formaldehyde resins include those from formoguanamine, benzo(guanamine), aceto(guanamine), stearo(guanamine), and adipodi(guanamine); also included are the methylated and ethylated forms.

Amino resins in general and water soluble amino resins in particular are discussed in: Polymer Processes, Schildknecht (High Polymers, vol. X), chapter VIII, "Condensations With Formaldehyde," Interscience Publishers, 1956, and in Amino Resins, Blais, Reinhold, 1959.

The Composition

The water soluble composition of the invention contains the defined resins in an amount of 5–40 weight percent of amino resin and 95–60 weight percent of modified polyester resin. More commonly, the composition contains the resins in an amount of 15–25 weight percent of amino resin and 85–75 weight percent of modified polyester resin.

The composition appears to be a mixture of the two defining resins. It is most easily prepared by intermingling water solutions of the respective water soluble polyester resin and water soluble amino resin. Or adding one of the resins to the water solution of the other resin.

It is to be understood that the composition may be utilized to prepare films on surfaces suitable for baked finishes directly or various pigments, fillers, extenders may be introduced into the water-resin solutions in order to prepare enamel-like baked finishes.

Illustrations

A polyester resin was prepared by polyester condensation of trimellitic anhydride, neopentyl glycol, and adipic acid in a mole ratio of 3:7:1. All the reactants were held in a stirrred flask provided with a reflux condenser and a sparge of nitrogen gas. The reaction was carried out at about 350° F. until the acid number of the product was 50; the hydroxyl number was about 200. The clear, yellowish solid resin was readily dissolved in an aqueous solution of dimethylethanol amine at 100° F. A commercial methyl(methylol)melamine resin was dissolved into the polyester resin solution. A paint was prepared by adding titaniumdioxide to the solution. Tin plate panels were coated with this paint and baked for 30 minutes at 300° F. The baked film was hard, glossy, and of satisfactory resistance to 2% sodium hydroxide solution. Panels were exposed to detergent tests wherein the panel is immersed in a solution of 1% commercial Tide detergent and held at 160° F. The film composed of 75 weight percent of polyester resin and 25 weight percent of water soluble amino resin blistered badly in 24 hours' immersion.

A modified polyester resin was prepared by condensing 1 mole of the above polyester resin with 1.5 moles of butyl Carbitol until an acid number of 20 was obtained. The modified polyester resin was dissolved into water containing dimethylethanolamine. An aqueous solution containing 75 weight percent of the modified polyester resin and 25 weight percent of the above commercial amino resin was prepared and pigmented with titanium dioxide. A tin plate panel coated with the composition containing the modified polyester resin was baked at 300° F. for 30 minutes to obtain a hard, glossy alkali resistant coating. In the detergent solution test no sign of attack was observed after 48 hours' immersion. After 72 hours' immersion, some blistering was evidenced (8D ASTM rating). After 96 hours' immersion, the coating had not deteriorated any further.

Thus, having described the invention, what is claimed is:

1. A water-soluble composition consisting essentially of the water soluble resin solution mixture of (A) the product of reaction of an alkaline substance and a polyester resin which polyester resin consists essentially of the polyester condensation reaction product of (a) a benzene tricarboxylic acidic member selected from the group consisting of trimellitic acid, trimellitic anhydride, trimesic acid, hemimellitic acid and hemimellitic anhydride, (b) aliphatic polyols, (c) aliphatic dicarboxylic acids containing a total of from 4 to about 60 atoms, and (d) polyalkylene glycol monoalkyl ether, wherein the mole ratio of acidic member:polyol:dicarboxylic acid:ether is from about 2:7:2:1 to about 4:7:1.5:4, said polyester resin has an acid number from about 20 to about 40, is capable of forming a thermoset solid film upon air-baking at a temperature on the order of 400° F., and has a water solution pH of between about 5 and 8, and (B) water soluble amino-resin selected from the class consisting of melamine-formaldehyde resins and guanamine-formaldehyde resins, said composition containing said resins in an amount of 5–40 weight percent of said amino resin and 95–60 weight percent of said polyester resin.

2. The water-soluble composition of claim 1 wherein said alkaline substance is alkanolamine.

3. The water-soluble composition of claim 1 wherein said alkaline susbtance is a lower molecular weight alkyl amine.

4. The water-soluble composition of claim 1 wherein said acidic member is trimellitic anhydride.

5. The water-soluble composition of claim 1 wherein said acid is adipic acid.

6. The water-soluble composition of claim 1 wherein said polyol is neopentyl glycol.

7. The water-soluble composition of claim 1 wherein said ether is diethylene glycol monobutyl ether.

8. The water-soluble composition of claim 1 wherein said amino resin is a methyl(methylol)melamine.

9. A water-soluble composition consisting essentially of the water-soluble resin solution mixture of (I) the product of reaction of an alkaline substance with the polyester condensation reaction product of (1) a benzene tricarboxylic acidic member selected from the class consisting of trimellitic acid, trimellitic anhydride, trimesic acid, hemimellitic acid and hemimellitic anhydride, (2) an alkanedioic acid containing from 4 to about 20 carbon atoms, (3) a lower glycol containing 2–12 carbon atoms, and (4) polyalkylene glycol monobutyl ether, said reaction being continued until the product has an acid number of about 20–30, wherein the mole ratio of acidic member:polyol:alkanedioic acid:ether is from 3:7:1:1 to about 4:7:1.5:4, which polyester resin is characterized by the formation of a thermoset solid upon air-baking at a temperature on the order of 400° F. and has a water solution pH of between about 5 and 8, and (II) water soluble amino-resin selected from the class consisting of melamine-formaldehyde resins and guanamine-formaldehyde resins, said composition containing said resins in an amount of 15–25 weight percent of said amino resin and 85–75 weight percent of said polyester resin.

10. The composition of claim 9 wherein said acidic member is trimellitic anhydride, said glycol is neopentyl glycol, said alkenedioic acid is adipic acid and said ether is diethylene glycol monobutyl ether.

11. The composition of claim 10 wherein said mole ratio is about 3:7:1:1.5.

References Cited in the file of this patent

UNITED STATES PATENTS

| | | |
|---|---|---|
| 2,562,878 | Blair | Aug. 7, 1951 |
| 2,895,946 | Huffman | July 21, 1959 |
| 2,901,465 | Sample | Aug. 25, 1959 |
| 2,939,857 | Bolton et al. | June 7, 1960 |
| 2,960,485 | Bolton et al. | Nov. 15, 1960 |
| 2,965,587 | Rickert | Dec. 20, 1960 |

OTHER REFERENCES

Amoco Chemicals, "Trimellitic Anhydride," Sept. 2, 1958, page 26 relied upon.

UNITED STATES PATENT OFFICE
CERTIFICATE OF CORRECTION

Patent No. 3,102,868 September 3 1963

Benjamin A. Bolton et al.

It is hereby certified that error appears in the above numbered patent requiring correction and that the said Letters Patent should read as corrected below.

Column 3, line 35, for "diethylethanolamine" read -- dimethylethanolamine --; column 4, line 23, for "defining" read -- defined --; column 5, line 8, after "60" insert -- carbon --.

Signed and sealed this 3rd day of March 1964.

(SEAL)
Attest: